United States Patent Office 2,754,281
Patented July 10, 1956

2,754,281

PLASTICIZED VINYL RESIN COMPOSITION CONTAINING VINYLCYCLOHEXANOL ESTERS

Robert C. Kuder, Sylvania, Ohio, assignor, by mesne assignments, to Allied Chemical & Dye Corporation, New York, N. Y., a corporation of New York No Drawing. Application December 17, 1952, Serial No. 326,595

21 Claims. (Cl. 260—31.2)

The present invention relates generally to the thermoplastic vinyl halide resins and more specifically to the art of plasticizing vinyl halide resins. Still more specifically the invention relates to the production of plastisol formulations comprising a vinyl halide polymer such as polyvinyl chloride and a sufficient quantity of a plasticizer or plasticizers for the resin to form a flowable paste or slurry.

Vinyl halide polymers normally are hard and horny in nature and require the addition of substantial quantities of oily plasticizing materials to be easily workable. In such plasticized condition, however, the vinyl halide resins have low softening points and frequently are greasy, sticky or tacky and are susceptible to attack by various solvents. To obtain relatively stiffer, harder and less soluble forms of such resins, which process with sufficient ease, by the use of ordinary plasticizers, is relatively difficult. Moreover, oily types of plasticizing materials bleed from the finished composition making the surface acquire an unpleasant oily feel. When sufficient plasticizer is lost in this way failure of the material occurs. The common forms of plasticized vinyl halide resins are excessively thermoplastic so that they "sag" or suffer flow such that they fail in electrical insulation applications.

There have been previous attempts to correct these deficiencies. For example, U. S. Patent Nos. 2,155,590 and 2,539,207 disclose so-called "polymerizable" or "vulcanizable" plasticizers for vinyl halide resins. However, such polymerizable plasticizers are deficient in compatibility, plasticizing efficiency, permanence, curability, stability, and availability such that their disadvantages far outweigh any advantages derived from their use.

I have discovered, however, that esters of a vinylcyclohexanol, which esters contain at least two olefinic double bonds have numerous novel properties when utilized as plasticizers for vinyl halide resins. Such esters can be utilized as the sole plasticizing ingredient or as a replacement for greater or lesser proportions of the more conventional, saturated or non-polymerizable plasticizers in conventional formulations. Certain of these esters polymerize without catalysts, particularly when bodied or partially pre-polymerized. Others have a marked stabilizing action on the finished composition such that ordinary vinyl resin stabilizers may be dispensed with or utilized in smaller amounts. As a class these esters are particularly adapted for use in vinyl halide resin plastisol formulations, their use permitting the production of very fluid plastisols from which harder, stronger, more abrasion-resistant, and insoluble coatings, etc. are obtained. The final properties of the plastisol coating or product can be varied from flexible through leathery or boardy to rigid, from soluble through partly soluble to insoluble, and from tough to brittle by the proper choice of auxiliary plasticizer, polymerization catalyst, pre-polymerization of the vinylcyclohexyl ester, and length of curing, molding or baking cycle.

The plasticizers of this invention are carboxylic acid esters of a vinylcyclohexanol, which esters contain at least two olefinic double bonds, and in which the double bonds preferably are separated by at least three atoms so as to be in non-conjugated relationship. The vinylcyclohexanol utilized in their manufacture can be any isomer such as 1-vinylcyclohexanol-2, 1-vinylcyclohexanol-3, 1-vinylcyclohexanol-4, or any substituted vinylcyclohexanol in which alkyl or hydroxy-alkyl substituents are attached directly to the cyclohexane nucleus by a carbon-to-carbon single bond. Particularly preferred are the vinylcyclohexanols selected from the class consisting of 3-vinylcyclohexanol, 4-vinylcyclohexanol and mixtures thereof. The economical manufacture of the latter materials from 4-vinylcyclohexene-1 and formic acid are disclosed in my copending application, S. N. 249,619, filed October 3, 1951.

In the preparation of a carboxylic acid ester of a vinylcyclohexanol for use as a plasticizer of this invention, the carboxylic acid used may be an unsaturated monocarboxylic acid or a saturated or unsaturated polycarboxylic acid, since the ester must contain at least two olefinic double bonds. Of course, as long as the vinylcyclohexyl esters of polycarboxylic acids contain at least two olefinic double bonds, they need not be neutral esters but may contain one or more unesterified carboxyl groups or salt groups. That is, vinylcyclohexyl esters of the invention include, for example, half or partial esters of unsaturated dicarboxylic and polycarboxylic acids in which one olefinic double bond is derived from the vinylcyclohexyl group and the other is derived from the unsaturated acid, but esters of the invention include only the neutral esters of saturated dicarboxylic acids.

Preferred unsaturated monocarboxylic acids include any substance whose molecule consists of a straight, branched or closed chain monovalent hydrocarbon group, having at least one unsaturated carbon-to-carbon bond and having from 2 to 21 carbon atoms, or a monovalent unsaturated aryl group, attached to a carboxyl group, or any such substance in which one or more hydrogen atoms in the hydrocarbon group have been replaced with hydroxy or phenyl groups, or halo groups having an atomic weight less than 80 (i. e., chlorine, bromine and fluorine). Thus, the unsaturated monocarboxylic acid may be any unsaturated fatty acid, aromatic acid or halo-, phenyl- or hydroxy-substituted unsaturated acid having from 3 to 22 carbon atoms (e. g., acrylic, methacrylic, crotonic, isocrotonic, vinylacetic, alpha-chloroacrylic, alpha-pentenic, hexenoic, hypogeic, oleic, alpha-ethylacrylic, alpha-hydroxyacrylic, cinnamic, erucic, undecylenic, palmitolic, propiolic, stearolic, sorbic, linoleic or linolenic acid or dehydrated castor oil acid, or vinylbenzoic acid, and others); or abietic acid.

Preferred saturated and unsaturated polycarboxylic acids include (a) any substance whose molecule consists of a di- or polyvalent straight or branched chain aliphatic hydrocarbon group, having saturated or unsaturated carbon-to-carbon bonds and having from 2 to 20 carbon atoms, the free valences being attached to carboxy groups, or any such substance in which one or two hydrogen atoms in the di- or polyvalent aliphatic group have been replaced with hydroxy or amino groups and (b) any substance whose molecule consists of a di- or polyvalent aryl group, having a total of not more than 10 nuclear and side chain carbon atoms, the free valences being attached to carboxy groups. Acids as defined in a (a) above include saturated aliphatic dicarboxylic acids in the series oxalic to octadecanedioic; unsaturated aliphatic dicarboxylic acids in the fumaric acid series; dienedioic acids such as muconic acid; amino acids such as aspartic acid and glutamic acid; hydroxy dicarboxylic acids and polycarboxylic acids such as malic, tartaric, and citric acids; alkynedioic acids such as acetylenedicarboxylic acid; saturated and unsaturated aliphatic polycarboxylic acids such as tricarballylic acid, 1,1,5-pentanetricarboxylic acid, 1,2,4-hexanetricarboxylic acid, aconitic acid, 3-hexene-2, 2,3,4-tetracarboxylic acid, and 5-octene-3, 3,6-tricarboxylic acid.

Preferred polycarboxylic acids as defined in (b) above include any aromatic polycarboxylic acid in which the aryl group has a total of not more than ten nuclear and side chain carbon atoms, the side chains, if any, consisting of not more than four primary, secondary or tertiary alkyl groups having a total of not more than four carbon atoms, and any nuclear substituents consisting of not more than four halogen atoms having an atomic weight less than 80. Such aromatic polycarboxylic acids include: phthalic acid, isophthalic acid, terephthalic acid, naphthalic acid, 4-methylisophthalic acid, tetrachlorophthalic acid, hemimellitic acid, pyromellitic acid, trimesic acid, trimellitic acid, and others.

Of course, if the anhydride (or even the chloride) of any of the above-described carboxylic acids is available it may be used instead of the acid.

The preferred vinylcyclohexyl esters of the invention that are esters of monocarboxylic acids include 3-vinylcyclohexyl acrylate, 4-vinylcyclohexyl acrylate, 3-vinylcyclohexyl cinnamate, 4-vinylcyclohexyl cinnamate, 3-vinylcyclohexyl oleate, 4-vinylcyclohexyl oleate, 3-vinylcyclohexyl linoleate, 4-vinylcyclohexyl linoleate, 3-vinylcyclohexyl sorbate, and 4-vinylcyclohexyl sorbate.

The preferred vinylcyclohexyl esters of the invention that are esters of polycarboxylic acids include such neutral esters as 3-vinylcyclohexyl succinate, 4-vinylcyclohexyl succinate, 3-vinylcyclohexyl 4-vinylcyclohexyl succinate, 3-vinylcyclohexyl phthalate, 4-vinylcyclohexyl phthalate, 3-vinylcyclohexyl 4-vinylcyclohexyl phthalate, 3-vinylcyclohexyl citrate, 4-vinylcyclohexyl citrate, 3-vinylcyclohexyl aconitate, 4-vinylcyclohexyl aconitate, and other mixed vinylcyclohexyl aconitates, 3-vinylcyclohexyl itaconate, 4-vinylcyclohexyl itaconate, 3-vinylcyclohexyl 4-vinylcyclohexyl itaconate, 3-vinylcyclohexyl fumarate, 4-vinylcyclohexyl fumarate, 3-vinylcyclohexyl 4-vinylcyclohexyl fumarate, 3-vinyl cyclohexyl maleate, 4-vinylcyclohexyl maleate, 3-vinylcyclohexyl 4-vinylcyclohexyl maleate, 3-vinylcyclohexyl ethyl maleate, 4-vinylcyclohexyl ethyl maleate, 3-vinylcyclohexyl ethyl fumarate and others.

Of these esters those which contain at least two vinylcyclohexyl groups attached to ester linkages are preferred.

More preferred vinylcyclohexyl esters of the invention are the esters of mono-olefinically-unsaturated mono- and dicarboxylic acids and of a vinylcyclohexanol selected from the class consisting of 3-vinylcyclohexanol, 4-vinylcyclohexanol, and mixtures thereof. Acids utilized in the preparation of this preferred class of esters include acrylic acid, methacrylic acid, crotonic acid, isocrotonic acid, vinylacetic acid, alpha-hydroxyacrylic acid, oleic acid, cinnamic acid, fumaric acid, maleic acid and others. Most preferred are the esters of the butenedioic acids, the neutral fumaric and maleic acid diesters.

In the preparation of esters embodying the invention a mixture of a carboxylic acid (or anhydride) and the vinylcyclohexanol is refluxed under atmospheric pressure until the theoretical amount of water is removed. The reaction mixture is then fractionally distilled, preferably under vacuum, to obtain the ester. High yields of the esters, approaching the theoretical yield in some cases, are obtained. The esters are easily obtained in water white condition by such a procedure. It is preferable to dissolve the vinylcyclohexanol in an organic solvent such as benzene, xylene or toluene which will distill azeotropically with the water. As the water and solvent boil off together, the water may be collected at the bottom of a water-trap and the solvent returned to the reaction mixture. An esterification catalyst is preferably employed during the esterification reaction. The preparation of representative esters of this invention by various methods is described in greater detail in my copending application, S. N. 259,490, filed December 1, 1951.

The resins which are most advantageously plasticized by admixture with the vinylcyclohexyl esters are the vinyl halide polymers such as those of vinyl chloride, vinyl bromide, vinyl fluoride and others, produced preferably, by the polymerization in an aqueous dispersion of a monomeric material comprising a vinyl halide such as vinyl chloride and, if desired, varying amounts of one or more other copolymerizable monoolefinic materials such as vinylidene chloride, vinylidene chlorofluoride, vinyl acetate, vinyl propionate, vinyl benzoate, acrylic acid, methacrylic acid, methyl acrylate, ethyl acrylate, n-butyl acrylate, n-hexyl acrylate, octyl acrylate, furfuryl acrylate, methyl methacrylate, octyl methacrylate, lauryl methacrylate, acrylamide, N,N-dimethyl acrylamide, acrylonitrile, methacrylonitrile, styrene, vinyl pyridine, diethyl maleate, diethyl fumarate, isobutylene, and others. Better results are obtained when the monomeric mixture comprises predominantly a vinyl halide, that is, 50% or more by weight. Best results are obtained by the use of high molecular weight polyvinyl chloride such as is commercially available as "Geon 101" or "Geon 121," vinyl chloride vinylidene chloride copolymers containing from 5 to 40% vinylidene chloride such as the commercially-available "Geon 200 series" resins, and vinyl chloride alkyl acrylate and vinyl chloride vinyl ester copolymers containing from 1 to 40% of one or more alkyl acrylates or vinyl carboxylates such as methyl, ethyl, and octyl acrylates, vinyl acetate, vinyl propionate, vinyl benzoate and others.

Plastisol formulations of this invention are prepared from any finely-divided (uniform particle size, size distribution, and shape) vinyl halide polymer. Polyvinyl chloride plastisol resins are most preferred.

The proportion of vinylcyclohexyl ester in the plasticized resin compositions may be varied from as little as 1 part to as much as 150 parts per 100 parts of resin (or about 1 to 60% of total composition). More preferably the vinylcyclohexyl ester should comprise from 5 to 75% by weight based on the resin. The composition also may contain in addition to resin and plasticizer greater or smaller amounts of stabilizers such as dibasic lead phosphite, tribasic lead phosphate, dibasic lead phthalate, organo-tin compounds such as tetraphenyl tin, strontium naphthenate, cadmium compounds, and many others; color pigments such as titanium dioxide and others; fillers such as barytes, precipitated calcium carbonate, diatomaceous earth, whiting, clay and others; lubricants, additional plasticizers, resins and other substances as is well understood in the art.

The above proportions are given for compositions in which the vinylcyclohexyl ester is the sole plasticizer. However, one of the important uses of the plasticizers of this invention is as a partial replacement for ordinary non-polymerizable plasticizers. Very small amounts, for example 1 to 15% based on the weight of resin of a vinylcyclohexyl ester, together with 5 to 45% by weight of an ordinary non-polymerizable ester such as dioctyl phthalate, produces plasticized vinyl resin compositions that are strong and hard, but not brittle, and which are more stable to light and heat than compositions not containing such vinylcyclohexyl ester. Such compositions also are more resistant to the effects of solvents than corresponding formulations not containing the vinylcyclohexyl esters. Compositions containing larger amounts of vinylcyclohexyl ester, for example 15 to 40%, together with 5 to 30% by weight of dioctyl phthalate or other plasticizer, are stiff, rigid, strong and insoluble compositions having good properties. In general good results are obtained when the ratio of vinylcyclohexyl ester to non-polymerizable plasticizer is varied from 10:1 to 1:10, more preferably from 6:1 to 1:6 with a total plasticizer content of from 5 to 75% based on the weight of resin.

Plastisol formulations, which constitute a particularly preferred embodiment of this invention, utilize relatively larger proportions of plasticizer than ordinary solid vinyl resin formulations. A conventional plastisol formulation contains at least 40 to 60 parts of dioctyl phthalate in order to obtain a spreadable viscosity. Plastisol formulations containing from 30 to 70 parts of plasticizer have been widely used. Those compositions, however, which contain sufficient plasticizer for easy application produce coatings or cast objects which are too soft and tacky for optimum abrasion resistance. Substitution of up to 85% of the total non-polymerizable plasticizer with a vinylcyclohexyl ester such as 3-vinylcyclohexyl 4-vinylcyclohexyl fumarate produces much harder, more abrasion-resistant coatings, moldings, and castings. The ratio of vinylcyclohexyl ester to non-polymerizable plasticizer may be varied from 1 to 10 to 10 to 1, the preferred ratio of vinylcyclohexyl to non-polymerizable plasticizer being in the range of 1:5 to 4:1 and most preferably 3:1. Used alone in a plastisol formulation the vinylcyclohexyl ester should constitute from 30 to 75% by weight of the resin. Plastigel formulations containing from 40 to 70 parts total plasticizer such as are used for low or pressureless molding are advantageously stiffened and insolubilized by the replacement of 20 to 60 parts of the non-polymerizable plasticizer with a vinylcyclohexyl ester such as vinylcyclohexyl fumarate.

Organosol formulations may also be produced using the vinylcyclohexyl esters as plasticizers. Dilution of a vinylcyclohexyl plastisol formulation, too viscous for good spreading, with a solvent such as acetone, xylene, toluene, methyl ethyl ketone, naphtha and others will give a spreadable coating when it is desired to keep the total plasticizer content low.

In the practice of the invention the vinylcyclohexyl esters may be incorporated in a solid vinyl resin by any conventional technique such as milling on a two-roll rubber or plastic mill, in an internal mixer, in a Banbury-type mixer and others. Plastisol, organosol or plastigel formulations are best prepared by mixing in one of the ribbon-type internal mixers that exert little rubbing or smearing action on the resin. Plastisol resins are commercially available having the ability to be merely stirred into liquid plasticizers without grinding or ball-milling. In the preparation of the final mix by any procedure, however, it is preferred that the composition be not exposed to temperatures in excess of 275 to 300° F., except only momentarily, in order to obviate cure of the vinylcyclohexyl ester during preliminary processing. A desirable manner of incorporating the vinylcyclohexyl ester in a solid vinyl resin is to disperse the liquid ester in an aqueous vinyl resin dispersion or latex and then coagulate or precipitate the combined dispersion. Blending of the resin and vinylcyclohexyl ester may be accomplished in solution by first dissolving the resin and then adding the vinyl cyclohexyl ester. Excellent coating materials useful for can linings etc. are produced by the latter methods.

The polymerization of the vinylcyclohexyl esters in the composition of this invention will occur during baking or molding or by contact with the air (in thin films). Vinyl resin plastisol formulations containing vinylcyclohexyl esters can be cured during the conventional heat-setting or fusion operation or by a short additional oven bake. To speed this reaction polymerization catalysts and/or metal salt paint driers may be incorporated. The catalysts found most satisfactory are selected from the class consisting of organic peroxides and ozonides, including for example, benzoyl peroxide, succinyl peroxide, tert-butyl perbenzoate, di-tert-butyl perphthalate, acetyl peroxide, peracetic acid, perbenzoic acid, toluyl peroxide, p-bromobenzoyl peroxide, anisoyl peroxide, chloroacetyl peroxide, o,o-dichlorobenzoyl peroxide, acetyl benzoyl peroxide, diacetyl peroxide, furoyl peroxide and 1-hydroxycyclohexyl hydroperoxide-1. Organic ozonide polymerization catalysts such as diisopropyl ozonide and diisobutylene ozonide also increase the rate at which addition polymerization of olefinic double bonds takes place. The peroxide and ozonide catalysts can be used in amounts ranging from 0.01 to 5%, based on the vinylcyclohexyl ester, with 0.5 to 2.5% being preferred.

The vinylcyclohexyl ester containing compositions of the invention can be cured in thin films or coatings by baking or by air drying, preferably in the presence of a peroxide catalyst or metallic paint drier. The term "metallic paint drier" is used herein to mean a cobalt, iron, copper, manganese or lead drier. The metals are usually added in the form of one of their soluble or compatible salts. Although it is preferable to employ the naphthenate of any of the above metals, any other salt of the metal which is soluble in the polymerizable ester may be employed, such as a resinate, linoleate or other salt of an unsaturated fatty acid, or a mixture of such salts. The proportion of the metallic drier in a polymerizable composition will vary somewhat with the ester and with the specific drier salt employed. The proportion of cobalt (present in a cobalt salt such as cobalt naphthenate) ordinarily may be from 0.0001 to 0.1% of the polymerizable ester. Manganese driers may be used in similar proportions. Lead driers, on the other hand, may be used in amounts from 0.05 to 0.5% of the polymerizable ester.

In some cases neither a catalyst or metal drier is necessary. The use of these materials merely increases the hardness of the final composition and shortens the cure time. When the vinylcyclohexyl esters are bodied (or pre-polymerized) slightly they cure very rapidly without catalyst. The amount of bodying will vary considerably depending on the particular ester and on the final viscosity desired. However, in no case should the bodying be carried too far because gelation or incipient gelation would render the ester unstable or otherwise unsuitable for plasticizer purposes. The heat-bodying may be accomplished by any of the several methods practiced in drying-oil technology. For example, the vinylcyclohexyl esters of unsaturated acids may be "blown" and "boiled." The vinylcyclohexyl esters may be bodied both with and without added copolymerizable monomeric materials such as styrene, methyl acrylate, acrylonitrile, vinyl acetate and others.

The heat-bodying of the vinylcyclohexyl esters is preferably carried out in the presence of air for a rapid rate of bodying, but even in the absence of air polymerization or bodying takes place. The composition, that comprises a vinylcyclohexyl ester alone or its mixtures with one or more polymerizable monomers, is heated in bulk without catalyst at temperatures ranging, for example, from about 200 to about 225° C. for vinylcyclohexyl maleates and fumarates. Temperatures lower than 200° C., e. g., as low as 150 to 175° C., may be used, particularly with more active vinylcyclohexyl esters such as vinylcyclohexyl acrylates, but the rate of bodying may be proportionately slower; temperatures above 225° C. to 250° C. are less desirable because of decomposition, discoloration and difficulty of control. For use as plasticizers the vinylcyclohexyl esters may be bodied to any desired degree short of incipient gelation and the viscosity reduced or adjusted by the addition, for example, of a more fluid unbodied vinylcyclohexyl ester, non-polymerizable plasticizer or solvent.

The heat-bodying of vinylcyclohexyl esters of the so-called drying oil acids such as oleic, linseed oil and dehydrated castor oil is considerably slower than that of the vinylcyclohexyl esters of such acids such as maleic, fumaric, acrylic, and itaconic acids. In fact, the bodying of the latter esters is more rapid than the bodying of natural drying oils. For example, a mixture of vinylcyclohexyl itaconates having an initial viscosity of C can be bodied in an open container to a viscosity of $Z_5$—$Z_6$, in one-half hour at 200° C. Under the same conditions a mixture of vinylcyclohexyl maleates having an initial viscosity of F can be bodied to a viscosity of $Z_3$. In an atmosphere of carbon dioxide the same maleate can be bodied from F to J in one-half hour at 200° C. By comparison, a drying oil such as tung oil having an initial viscosity of K is bodied in air, under these same conditions, only to a viscosity of V—W. The bodied esters are sufficiently light in color to meet the most critical requirements of resin applications.

The invention will now be described with greater particularity with reference to certain specific examples which demonstrate the preparation of representative esters and their utilization as plasticizers for a representative vinyl halide resin such as polyvinyl chloride. The examples are intended to be illustrative only. Unless otherwise specified the proportions are given as % by weight of the total plasticized resin composition.

EXAMPLE I

Unsaturated carboxylic acid esters of technical mixture of 4-vinylcyclohexanol and 3-vinylcyclohexanol obtained by saponification of the reaction product of 4-vinylcyclohexene and formic acid, as disclosed in my copending application S. N. 249,619, filed October 3, 1951, is prepared as follows:

(a) Fumaric acid (0.15 mol), vinylcyclohexanol (0.4 mol) in a solvent (75 cc. of toluene) and a catalyst (0.3 cc. of ethane sulfonic acid) are charged to a 250 cc. flask fitted with a thermometer and a reflux condenser fitted to a water trap. The mixture is refluxed for seven hours at 128° C. The mixture is then cooled and washed free of acid with a 5% aqueous solution of sodium hydroxide. The mixture is then fractionally distilled under reduced pressure. After distilling off the toluene and the excess vinylcyclohexanol, there is obtained a 72% yield of a mixture of neutral esters comprising 3-vinylcyclohexyl fumarate, 4-vinylcyclohexyl fumarate, and 3-vinylcyclohexyl 4-vinylcyclohexyl fumarate, B. P. 155 to 160° C. at 0.03 mm. Hg; $d_4^{20}$ 1.055; $n_D^{25}$ 1.499; viscosity (Gardner-Holdt) I.

(b) A mixture of vinylcyclohexanol (10.0 mols) in a solvent (1250 cc. of toluene) and maleic anhydride (3.8 mols) is refluxed for two hours at 128° C. in a 5-liter flask fitted with a thermometer and a reflux condenser connected to a water trap. The reaction mixture is then cooled to room temperature and a catalyst (7.6 cc. of ethane sulfonic acid) is added before refluxing the mixture four hours longer at 128° C. The cooled mixture is washed free of acid with a 5 per cent solution of sodium hydroxide and is then fractionally distilled under reduced pressure. After distilling off the toluene and the excess vinylcyclohexanol, there is obtained a 94% yield of a mixture of neutral esters comprising 3-vinylcyclohexyl maleate, 4-vinylcyclohexyl maleate and 3-vinylcyclohexyl 4-vinylcyclohexyl maleate, B. P. 150° C. at 0.05 mm. Hg; $d_4^{20}$ 1.054; $n_D^{25}$ 1.497; viscosity (Gardner-Holdt) F.

EXAMPLE II

A high molecular weight polyvinyl chloride plastisol resin having an average specific viscosity of 0.40 to 0.60 and known as "Geon 121" or an equivalent such as "Vinylite QYNV" or "Vinylite VYNV.2" is utilized in this example. The non-polymerizable plasticizer used as a control is di-2-ethylhexyl phthalate ("Flexol" Plasticizer DOP), hereinafter referred to as DOP.

The weighed portions of resin and plasticizer are mixed thoroughly by hand until a smooth, even dispersion is obtained. The mixture is then de-aerated in a vacuum dessicator. Films are prepared from the de-aerated plastisol by spreading on a glass plate with a blade having a clearance of 1/32 inch. The films are then baked in an oven at 350° F. (177° C.) for lengths of time varying from 10 to 30 minutes. Films are prepared in this manner from vinylcyclohexyl maleate (VCM) and vinylcyclohexyl fumarate (VCF) made as in Example I. Several of the films are made with 1% benzoyl peroxide added.

The films after baking and cooling to room temperature are removed from the glass plates and tested for flexibility, strength, and solubility. The flexibility test utilized is the cantilever-type "sag" test. By this method a rectangular strip of film 1 x 3 inches is clamped at one end in a horizontal position with an overhang of two inches. The flexibility is measured by the angle of deflection from horizontal assumed by the film bending under its own weight. The initial deflection and final deflection are recorded and also the time required to reach the final value. Films having an initial and final deflection of 0° by this procedure are classified as rigid.

Solubility is qualitatively determined by immersing small pieces of film in cyclohexanone. The results are given in Table I.

*Table I*

| Film | Plasticizer | Bz$_2$O$_2$ percent | Bake, Min., 350° F. | Deflection Initial, degrees | Deflection Final, degrees | Deflection Time, sec. | Remarks |
|---|---|---|---|---|---|---|---|
| 1 | 30% DOP | | 10 | 25 | 52-58 | 90-120 | Soluble, strong. |
| 2 | 35% DOP | | 10 | 50-60 | 68-72 | 90 | Do. |
| 3 | 40% DOP | | 10 | 70 | 76 | 30 | Do. |
| 4 | 40% DOP | | 15 | 65 | 71 | 30 | Do. |
| 5 | 45% DOP | | 10 | 82 | 83 | 20 | Do. |
| 6 | 40% VCM | | 10 | 55 | 78 | 30 | Do. |
| 7 | 40% VCM | | 15 | 40 | 74 | 60 | Do. |
| 8 | 40% VCM | 1 | 10 | 30 | 75 | 120 | Partly soluble, strong. |
| 9 | 40% VCF | | 10 | 35 | 75 | 120 | Do. |
| 10 | 40% VCF | | 15 | 15 | 73 | 150 | Do. |
| 11 | 40% VCF | | 20 | 2 | 43 | 240 | Do. |
| 12 | 40% VCF | | 30 | 1 | 37 | 240 | Do. |
| 13 | 50% VCF | | 15 | 35 | 68 | 210 | Do. |
| 14 | 60% VCF | | 10 | 90 | 90 | 0 | Insoluble, very hard. |
| 15 | 40% VCF | 1 | 10 | 0 | 5 | 300 | Do. |
| 16 | 40% VCF | 1 | 30 | 0 | 0 | (Rigid) | Do. |
| 17 | 45% VCF | 1 | 10 | 3 | 43 | 270 | Do. |
| 18 | 50% VCF | 1 | 10 | 2 | 38 | 390 | Do. |
| 19 | 60% VCF | 1 | 15 | 0 | 0 | (Rigid) | Do. |

The results shown in Table I illustrate the value of the vinylcyclohexyl esters as sole plasticizers. For example, the use of 40% vinylcyclohexyl maleate (sample 6) with a 10 minute fusion (too short for substantial cure of the uncatalyzed maleate) produces a film having approximately similar thermoplasticity as compared to the DOP control of sample 3. The addition of 1% benzoyl peroxide (sample 8) produces a marked stiffening and resistance to flow. Even more outstanding, however, is the stability to light and heat of samples 6 and 7 as compared to samples 1 to 5. After continued baking for as long as 30 minutes at 350° F. the maleate-plasticized films are not appreciably discolored while the corresponding DOP controls are markedly darker after baking for the same interval.

The use of 40% vinylcyclohexyl fumarate (samples 9 to 12) show the relatively greater ease of polymerization of this ester as compared to the maleate. Marked increase in the hardness and stiffness characterize the former. The fumarate plasticized films show a stabilizing action similar to that of the maleate but not to such a marked degree (all films illustrated in Table I are prepared without conventional polyvinyl chloride stabilizers). The use of 1% benzoyl peroxide causes a remarkable increase in the hardness, rigidity and insolubility of fumarate-containing films. Neither the fumarate—nor maleate—plasticized films evidenced any sweating or bleeding of plasticizer. All films were as clear as the corresponding DOP controls.

EXAMPLE III

Similar experiments are conducted with the same polyvinyl chloride plastisol resin and vinylcyclohexyl fumarate which has been bodied, or partially pre-polymerized (P–VCF), from viscosity I–J to viscosity P (Gardner-Holdt). Films are prepared and tested in the same manner as in Example II. The results are summarized in Table II, as follows:

*Table II*

| Film No. | Plasticizer | Bz₂O₂, percent | Bake, Min. | Deflection Initial, degrees | Deflection Final, degrees | Deflection Time, Sec. | Remarks |
|---|---|---|---|---|---|---|---|
| 1 | 40% P-VCF | | 10 | 2 | 44 | 240 | Strong. |
| 2 | 40% P-VCF | | 15 | 0 | 0 | (Rigid) | Do. |
| 3 | 50% P-VCF | | 15 | 0 | 16 | 240 | Rigid, Hard. |
| 4 | 50% P-VCF | | 20 | 0 | 0 | (Rigid) | Do. |
| 5 | 40% P-VCF | 1 | 10 | 0 | 0 | do | Do. |
| 6 | 40% P-VCF | 1 | 15 | 0 | 0 | do | Do. |

Thus the use of 40% of the partially bodied vinylcyclohexyl fumarate (samples 1 and 2, Table II), without catalyst, cures in 10 to 15 minutes at 350° F. to a harder, more rigid composition than a similar composition containing 40% of unbodied vinylcyclohexyl fumarate and 1% benzoyl peroxide (samples 9 and 15, Table I). This cure without catalyst is a very important advantage in a polymerizable vinyl halide resin plasticizer. All of the films of Table II are of reduced solubility.

EXAMPLE IV

The previous examples have utilized the vinylcyclohexyl esters as sole plasticizers to produce very hard and stiff compositions. The partially bodied vinylcyclohexyl fumarate of Example III is somewhat too viscous for easy plastisol application and the final films are somewhat too brittle for some applications. A number of plastisol formulations are made at 40% total plasticizer content using DOP as a diluent for the bodied and unbodied vinylcyclohexyl fumarates. The ratios of fumarate to DOP are 1:1 and 3:1 together with 1% benzoyl peroxide. The results are as follows:

hard yet are less brittle than those made with the fumarate ester alone. They also are exceptionally strong and tough and have moderate solvent resistance.

EXAMPLE V

Plastigel formulations are putty-like modified plastisol compositions adapted for low or pressureless molding. They are utilized in the production of toys, etc. and for molds for Plaster-of-paris or ceramic materials and the ungelled or more fluid forms, in the coating of wires and electroplating racks, etc. Two plastigel formulations having about the same consistency are prepared by mixing materials in the following proportions:

| | Parts by Wt. A | Parts by Wt. B |
|---|---|---|
| Geon 121 | 100 | 100 |
| DOP | 50 | 14 |
| VCF | | 41 |
| Benzoyl Peroxide ¹ | | 0.8 |
| Lead Stabilizer ² | 2 | 4 |
| Bentonite Gelling Agt. ³ | 6 | 7 |

¹ 50% paste in tricresyl phosphate ("Luperco ATC").
² Lead phosphite ("Dyphos").
³ Organic-modified bentonite ("Bentone").

When A is hand molded and then baked 5 to 10 minutes at 350° F. a tough flexible article is obtained. Composition B under the same conditions yields a tough, hard and practically-inflexible article.

EXAMPLE VI

A technical mixture of vinylcyclohexyl acrylates, which is too volatile for plasticizer use, is bodied to a viscosity of about F to K (Gardner-Holdt). In this manner the volatility is greatly reduced without impairing the plasticizing efficiency. The bodied acrylate ester cures very rapidly in plastisol formulations and produces hard and tough films and coatings.

EXAMPLE VII

Vinylcyclohexyl maleates and fumarates prepared as in Example I can be milled into high molecular weight polyvinyl chloride, vinyl chloride vinyl acetate copolymers, and vinyl chloride vinylidene chloride copolymers at temperatures of 225 to 275° F. without appreciable cure of the ester. Banbury mixing at somewhat similar temperatures is readily accomplished in 1 to 5 minutes.

*Table III*

| Film No. | Plasticizer | Bz₂O₂, percent | Bake, Min. | Deflection Initial, degrees | Deflection Final, degrees | Deflection Time, sec. | Remarks |
|---|---|---|---|---|---|---|---|
| 1 | 40% VCF:DOP(1:1) | 1 | 10 | 35 | 72 | 120 | Strong, Part Soluble. |
| 2 | 40% VCF:DOP(1:1) | 1 | 30 | 20 | 69 | 120 | Do. |
| 3 | 40% VCF:DOP(3:1) | 1 | 10 | 10 | 52 | 90 | Do. |
| 4 | 40% VCF:DOP(3:1) | 1 | 20 | 0 | 10 | 60 | Do. |
| 5 | 40% P-VCF:DOP(1:1) | 1 | 10 | 30 | 53 | 90 | Do. |
| 6 | 40% P-VCF:DOP(1:1) | 1 | 15 | 20 | 65 | 120 | Do. |
| 7 | 40% P-VCF:DOP(3:1) | 1 | 10 | 5 | 59 | 240 | Do. |
| 8 | 40% P-VCF:DOP(3:1) | 1 | 15 | 0 | 23 | 270 | Do. |
| 9 | 40% P-VCF:DOP(3:1) | 1 | 20 | 0 | 22 | 480 | Do. |

In each case a smooth plastisol is obtained which spreads very easily. The resultant films are clear and From such compositions rods, tubes and pipes may be extruded, which articles may be further rigidified by further heating. Electrical insulation such as hard, stiff and abrasion resistant cable sheathing may similarly be applied by extrusion directly onto the conductor itself. Similar results are obtained by the use of vinylcyclohexyl itaconates, vinylcyclohexyl aconitates, vinylcyclohexyl phthalates, and other vinylcyclohexyl esters.

EXAMPLE VIII

A sample of neutral vinylcyclohexyl phthalates comprising 3-vinylcyclohexyl phthalate, 4-vinylcyclohexyl phthalate, and 3-vinylcyclohexyl 4-vinylcyclohexyl phthalate, B. P. 183° C. at 0.01 mm. Hg., $d_4^{20}$ 1.085; $n_D^{23}$ 1.528; viscosity (Gardner-Holdt) Z–3, is made by procedures similar to those of Example I. Thirty parts of this ester mixture is incorporated as a plasticizer in 100 parts of a commercial vinyl chloride vinyl acetate copolymer ("Vinylite VYNS"). A sample of the composition is filmed into a strip 0.041 inch thick and 12.5 mm. wide. A 500 gram weight is attached to the end of the film and is suspended from the film for 20 seconds. A 21.5% elongation in the film results. A similar film of the copolymer which does not contain a vinylcyclohexyl phthalate as a plasticizer is not elongated in such a test.

The invention has been described, in the foregoing examples, with reference to di-2-ethylhexyl phthalate as the auxiliary or diluent, non-polymerizable plasticizer. It is to be understood, however, that the nature of the auxiliary plasticizer is in no wise critical and other liquid nonpolymerizable plasticizers may be utilized such as any of the esters of phthalic, sebacic, succinic, adipic, oleic, caprylic, oxalic, phosphoric and like acids, including di-butyl phthalate, ethyl phthalyl ethyl glycollate, methyl phthalyl ethyl glycollate, butyl phthalyl ethyl glycollate, dioctyl sebacate, dibutyl sebacate, di-n-hexyl phthalate, di-butoxyethyl phthalate, carbitol phthalate, methyl cellosolve phthalate, glycol sebacate, dihexyl sebacate, diethyl succinate, dibutyl succinate, octadecyl butyl succinate, diisobutyl adipate, bis-(ethylene glycol monobutyl ether) adipate, ethylene glycol monobutylether oleate, 1,10-decamethylene glycol dicaprylate, tributyl aconitate, dilauryl oxalate, saturated dicarboxylic acid glycol polyesters, tricresyl phosphate and others. Some of these plasticizers are especially efficient in plastisol formulations and are known as "primary" plasticizers while other less efficient materials are known as "secondary." Thus the present invention includes the use of the primary and secondary plasticizers in admixture with the vinylcyclohexyl esters.

The vinyl resin formulations of this invention, particularly the plastisol type, may be utilized in rapid drying printing inks; the coating of upholstery materials, plating racks, etc.; the molding of dolls, toys, prosthetic devices, etc.; the provision of linings for tanks, drums, cans, etc., and the coating of tablecloths, shower curtains, and the like, wherever toughness, chemical inertness, unlimited color range and resistance to abrasion and aging are desired.

The present application is a continuation-in-part of my copending applications, Serial Nos. 259,489 and 259,490 filed December 1, 1951, wherein the utilization of the vinylcyclohexyl esters as vinyl resin plasticizers is disclosed.

While I have disclosed certain preferred manners of performing my invention, I do not thereby desire or intend to limit myself solely thereto, for the precise proportions of the materials utilized may be varied and equivalent chemical materials may be employed, if desired, without departing from the spirit and scope of the invention as defined in the appended claims.

I claim:

1. A plasticized vinyl resin composition comprising a vinyl halide resin and, as a plasticizer therefor, from 1 to 150 parts by weight per 100 parts of said resin of a carboxylic acid ester of a vinylcyclohexanol, which ester contains at least two olefinic double bonds.

2. A plasticized vinyl resin composition comprising a vinyl halide resin and, as a plasticizer therefor, from 5 to 75 parts by weight per 100 parts of said resin of a vinylcyclohexyl ester of a polycarboxylic acid, which ester contains at least two vinylcyclohexyl groups and said vinyl halide resin being a polymer of a monomeric mixture comprised predominantly of the said vinyl halide.

3. A plasticized vinyl resin composition comprising a vinyl halide resin and, as a plasticizer therefor, from 5 to 75 parts by weight per 100 parts of said resin of an ester of a vinylcyclohexanol selected from the class consisting of 3-vinylcyclohexanol, 4-vinylcyclohexanol and mixtures tereof and of a carboxylic acid selected from the class consisting of monoolefinically-unsaturated mono- and dicarboxylic acids, said vinyl halide resin being a polymer of a monomeric mixture comprised predominantly of vinyl chloride.

4. A plasticized vinyl resin composition comprising polyvinyl chloride and, as a plasticizer therefor, from 5 to 75 parts by weight per 100 parts of said resin of a mixture comprising 3-vinylcyclohexyl maleate, 4-vinylcyclohexyl maleate and 3-vinylcyclohexyl 4-vinylcyclohexyl maleate.

5. A plasticized vinyl resin composition comprising polyvinyl chloride and, as a plasticizer therefor, from 5 to 75 parts by weight per 100 parts of said resin of a mixture comprising 3-vinylcyclohexyl fumarate, 4-vinylcyclohexyl fumarate and 3-vinylcyclohexyl 4-vinylcyclohexyl fumarate.

6. A plasticized vinyl resin composition comprising polyvinyl chloride and, as a plasticizer therefor, from 5 to 75 parts by weight per 100 parts of said resin of a mixture comprising 3-vinylcyclohexyl acrylate and 4-vinylcyclohexyl acrylate.

7. A plasticized vinyl resin composition comprising polyvinyl chloride and, as a plasticizer therefor, from 5 to 75 parts by weight per 100 parts of said resin of a partially bodied mixture comprising 3-vinylcyclohexyl fumarate, 4-vinylcyclohexyl fumarate and 3-vinylcyclohexyl 4-vinylcyclohexyl fumarate.

8. A plasticized vinyl resin composition comprising a vinyl halide resin, a non-polymerizable plasticizer, and a carboxylic acid ester of a vinylcyclohexanol, which vinylcyclohexyl ester contains at least two olefinic double bonds, the total plasticizer being from 5 to 75% by weight, based on said resin, with the weight ratio of vinylcyclohexyl ester to non-polymerizable plasticizer being from 10:1 to 1:10.

9. A plasticized vinyl resin composition comprising polyvinyl chloride, a non-polymerizable ester that is a polyvinyl chloride plasticizer and a mixture comprising 3-vinylcyclohexyl maleate, 4-vinylcyclohexyl maleate and 3-vinylcyclohexyl 4-vinylcyclohexyl maleate, the total plasticizer being from 5 to 75% by weight, based on said polyvinyl chloride, with the weight ratio of said maleate mixture to said non-polymerizable plasticizer being from 6:1 to 1:6.

10. A plasticized vinyl resin composition comprising polyvinyl chloride, a non-polymerizable ester that is a polyvinyl chloride plasticizer and a mixture comprising 3-vinylcyclohexyl fumarate, 4-vinylcyclohexyl fumarate and 3-vinylcyclohexyl 4-vinylcyclohexyl fumarate, the total plasticizer being from 5 to 75% by weight, based on the polyvinyl chloride, with the weight ratio of said fumarate mixture to said non-polymerizable plasticizer being from 6:1 to 1:6.

11. A plastisol formulation comprising a polymer of a vinyl halide and, as a plasticizer therefor, from 5 to 75% by weight, based on said polymer, of a carboxylic acid ester of a vinylcyclohexanol, which ester contains at least two olefinic double bonds.

12. A plastisol formulation comprising a polymer of a monomeric mixture comprising predominantly a vinyl halide and, as a plasticizer therefor, from 5 to 75% by weight, based on said polymer, of a vinylcyclohexyl ester of a polycarboxylic acid, which ester contains at least two vinylcyclohexyl groups.

13. A plastisol formulation comprising a polymer of vinyl chloride and, as a plasticizer therefor, from 5 to 75% by weight, based on said polymer, of an ester of a vinylcyclohexanol selected from the class consisting of 3-vinylcyclohexanol, 4-vinylcyclohexanol and mixtures thereof and of a carboxylic acid selected from the class consisting of monoolefinically-saturated mono- and di-carboxylic acids.

14. A plastisol formulation comprising a finely-divided plastisol form of polyvinyl chloride dispersed in from 5 to 75% by weight, based on the said polyvinyl chloride, of a mixture comprising 3-vinylcyclohexyl maleate, 4-vinylcyclohexyl maleate and 3-vinylcyclohexyl 4-vinylcyclohexyl maleate.

15. A plastisol formulation comprising a finely-divided form of polyvinyl chloride dispersed in from 5 to 75% by weight, based on the weight of said polyvinyl chloride, of a mixture comprising 3-vinylcyclohexyl fumarate, 4-vinylcyclohexyl fumarate and 3-vinylcyclohexyl 4-vinylcyclohexyl fumarate.

16. A plastisol formulation comprising a finely-divided form of a polymer of vinyl chloride dispersed in from 5 to 75% by weight, based on said polymer, of a mixed plasticizer comprising a non-polymerizable plasticizer and a carboxylic acid vinylcyclohexanol ester containing at least two olefinic double bonds, the weight ratio of said vinylcyclohexanol ester to said non-polymerizable ester being from 10:1 to 1:10.

17. A plastisol formulation comprising a finely-divided form of a vinyl chloride polymer, a carboxylic acid vinylcyclohexanol ester containing at least two olefinic double bonds, and a polymerization catalyst, the proportions of said vinylcyclohexanol ester present being from 5 to 75% by weight, based on said polymer.

18. A plastisol formulation comprising a finely-divided form of a vinyl chloride polymer and from 5 to 75% by weight, based on said polymer of a partially polymerized, liquid carboxylic acid vinylcyclohexanol ester containing at least two olefinic double bonds.

19. A plastisol formulation comprising a finely-divided form of polyvinyl chloride dispersed in a mixed plasticizer comprising a mixture comprising 3-vinylcyclohexyl fumarate, 4-vinylcyclohexyl fumarate and 3-vinylcyclohexyl 4-vinylcyclohexyl fumarate and a non-polymerizable ester that is a plasticizer, the total mixed plasticizer being from 5 to 75% by weight, based on said polyvinyl chloride, with the weight ratio of said fumarate mixture to said non-polymerizable plasticizer being from 6:1 to 1:6.

20. A plastisol formulation comprising a finely-divided form of polyvinyl chloride, a mixed plasticizer comprising a mixture comprising 3-vinylcyclohexyl fumarate, 4-vinylcyclohexyl fumarate and 3-vinylcyclohexyl 4-vinylcyclohexyl fumarate, and di-2-ethylhexyl phthalate, and an organic peroxide polymerization catalyst, the total mixed plasticizer being from 5 to 75% by weight, based on said polyvinyl chloride, with the weight ratio of fumarate mixture to di-2-ethylhexyl phthalate being from 6:1 to 1:6.

21. A plastisol formulation comprising a finely-divided polyvinyl chloride and from 5 to 75% by weight, based on said polyvinyl chloride, of a partially polymerized, liquid fumaric acid ester of a vinylcyclohexanol.

References Cited in the file of this patent

UNITED STATES PATENTS 2,340,108    D'Alelio _____ Jan. 25, 1944